United States Patent [19]
Jiang et al.

[11] Patent Number: 6,085,007
[45] Date of Patent: Jul. 4, 2000

[54] PASSIVE ALIGNMENT MEMBER FOR VERTICAL SURFACE EMITTING/DETECTING DEVICE

[76] Inventors: Ching-Long Jiang, 55 Ketcham Rd., Belle Mead, N.J. 08502; Robert Addison Boudreau, Sr., 1270 Stonegate Rd., Hummelstown, Pa. 17036

[21] Appl. No.: 09/031,592

[22] Filed: Feb. 27, 1998

[51] Int. Cl.$^7$ .................................................. G02B 6/36
[52] U.S. Cl. ........................ 385/92; 385/88; 385/93; 385/14
[58] Field of Search ................... 385/92, 88–94, 385/8, 14, 15, 125, 137

[56] References Cited

U.S. PATENT DOCUMENTS

| | | | |
|---|---|---|---|
| 4,802,727 | 2/1989 | Stanley | 350/96.2 |
| 4,904,036 | 2/1990 | Blonder | 350/96.11 |
| 5,011,247 | 4/1991 | Boudreau et al. | 350/96.2 |
| 5,073,003 | 12/1991 | Clark | 385/33 |
| 5,077,878 | 1/1992 | Armiento et al. | 29/25.02 |
| 5,163,108 | 11/1992 | Armiento et al. | 385/89 |
| 5,179,609 | 1/1993 | Blonder et al. | 385/89 |
| 5,182,782 | 1/1993 | Tabasky et al. | 385/89 |
| 5,412,748 | 5/1995 | Furuyama et al. | 385/92 |
| 5,420,953 | 5/1995 | Boudreau et al. | 385/88 |
| 5,481,629 | 1/1996 | Tabuchi | 385/14 |
| 5,533,158 | 7/1996 | Han et al. | 385/88 |
| 5,555,333 | 9/1996 | Kato | 385/89 |
| 5,687,267 | 11/1997 | Uchida | 385/89 |
| 5,905,831 | 5/1999 | Boudreau et al. | 385/88 |
| 5,913,002 | 6/1999 | Jiang | 385/88 |
| 5,933,551 | 8/1999 | Boudreau et al. | 385/14 |

FOREIGN PATENT DOCUMENTS

| | | |
|---|---|---|
| 0 226 296 | 6/1987 | European Pat. Off. . |
| 0 304 118 | 2/1989 | European Pat. Off. . |
| 0 532 469 A1 | 3/1993 | European Pat. Off. . |
| 43 01 236 C 1 | 3/1994 | Germany . |
| 55-157277 | 12/1980 | Japan ............ H01L 21/12 |
| 59-185306 | 10/1984 | Japan ................. 385/49 |
| 63-239890 | 10/1988 | Japan ................. 385/88 |
| 2-4204 | 1/1990 | Japan ................. 385/49 |
| 5-249340 | 9/1993 | Japan ................. 385/49 |
| 6-118262 | 4/1994 | Japan ................. 385/88 |

OTHER PUBLICATIONS

U.S. application No. 08/269,300, filed Sep. 12, 1994. Entitled "Solder Attachment of Optical Fiber To Semiconductor Waferboard"; Boudreau et al.

U.S. application No. 08/674,770; filed Jan. 26, 1998. Entitled "Passive Alignment Frame Using Monocrystalline Material"; Boudreau et al.

*Primary Examiner*—Phan T. H. Palmer

[57] ABSTRACT

Passive alignment members for surface emitting and detecting optoelectronic devices having a silicon substrate with a front surface and a back surface and a selected thickness therebetween; side surfaces with holes having vertical registration surfaces etched therein for receiving alignment pins; and at least one optoelectronic device disposed on the front surface, the device being aligned to the hole.

6 Claims, 2 Drawing Sheets

PASSIVE ALIGNMENT MEMBER FOR VERTICAL SURFACE EMITTING/DETECTING DEVICE

The present invention is related to U.S. Pat. No. 5,420,953; U.S. patent application Ser. No. 08/674,770, filed Jan. 26, 1998 now U.S. Pat. No. 5,905,831; U.S. patent applications Ser. No. 09/031,585 now U.S. Pat. No. 5,913,002 and U.S. Pat. No. 5,981,975 filed on even date herewith.

FIELD OF THE INVENTION

The present invention relates to a fiber optic passive alignment member using silicon waferboard technology, commonly known as silicon optical bench for aligning passive and active optical devices on a monocrystalline material.

BACKGROUND OF THE INVENTION

The use of monocrystalline materials has enabled the passive alignment of optical devices to optical fiber for optical communication with great precision. The use of these materials to replace the requirements for active device optical alignment enables a low-cost, large production capability for fiber optics that have application in the fiber to the home (FTTH) and fiber to the office (FTTO) markets. Accordingly, in the recent past, there has been a great deal of activity and interest in the development of passive alignment of optical devices to optical fibers based on the use of monocrystalline materials. A common material for such use is monocrystalline silicon, as its crystalline properties are well known in the art. In U.S. Pat. No. 4,210,923 to North, et al., as well as other publications on anisotropic etching of silicon for passive alignment teach the preferred techniques for using silicon as an optical bench. (See for example silicon optoelectronic platforms disclosed in "Optoelectronic Integration: Physics, Technology and Applications", 1994 by Kluwer Academic Publishers, pages 399–417 and IEEE Transactions on Electronic Devices, ED-25,(10) 1178 (1978), by E. Bassous, the disclosures of which are specifically incorporated herein by reference.

One of the preferred categories of devices in optical communications is the surface emitting and receiving device. To this end, the use of such devices as a vertical cavity surface emitting laser (VCSEL) as well as surface emitting light emitting diodes (SLED) and photodetectors, to include PIN photodiodes, that have a photosensitive surface to receive or emit light from a top or bottom surface has required a great deal of modification to effect the alignment of the device to an optical fiber. In general, to effect the alignment between the device and the fiber using a silicon optical bench, it is required to have the device on a different plane other than that of the fiber, with the light being communicated there between a brightly reflective surface. Examples of such techniques are found, for example, in U.S. Pat. Nos. 5,073,003 and 4,904,036, to Clark and Blonder, respectively, the disclosures of which are specifically incorporated herein by reference. While such technology has its merits in allowing passive alignment to be effected, it is required none the less that the device be actively aligned into position so that the light is properly reflected by the reflective surface. Furthermore, the use of the reflective surface decreases coupling efficiency, since there is an intrinsic loss incurred at each optical surface through dispersive effects. Accordingly, a more efficient system would allow for in line coupling between the optical fiber and the surface emitting/detecting device.

One such example of co-linear coupling of an optoelectronic device to an optical fiber is as disclosed in U.S. Pat. No. 5,179,609 to Blonder, et al. The disclosure of this patent is specifically incorporated herein by reference. This reference to Blonder, et al., makes use of two pieces of monocrystalline material as mounting members that have etched therein detents in complimentary locations on each of the pieces of the mounting members. These detents receive microspheres to effect the alignment of the mounting members to effect the coupling of the device to the fiber. While the reference to Blonder, et al., does disclose the use of other types of alignment fiducials, the complexity of this design, including the alignment microspheres make it impractical for large scale manufacture. Another area of great interest is the miniaturization of transceivers, to include "mini MT" transceiver. This reduced footprint device has the promise for high speed data transmission and reception in the miniaturized package. The industry standard for this structure requires the use of a connector body supporting pins with the pins used to align the optical fiber to the optoelectronic device with lenses for optical coupling disposed there between. These lenses are used to effect the coupling to and from the light detecting and receiving devices, respectively and reduce to an acceptable level any cross-talk to an acceptable level. Further details can be found in the above referenced patent application.

One of the potential drawbacks to the alignment frame for mounting the optoelectronic devices and coupling them to optical fibers as is disclosed in the reference to Jiang U.S. Pat. No. 5,913,002 specifically shown at 202 in FIG. 1 of the application, is in the large scale manufacturability in a precise manner of the frame. To this end, the holes for the guide pins, 205 in the application, for receiving the guide pins, 201 in the application, must be located with great precision. Therefore, what is needed is a technique which enables the precise alignment of the guide pins in the passive alignment frame for the optoelectronic devices in a manner which is both reliable from the standpoint of precision and readily manufactured in large scale to effect a reduced cost in the overall device.

SUMMARY OF THE INVENTION

The present invention relates to the use of the 110 crystalline silicon as the optical bench for the optoelectronic devices in a mini-MT transceiver package. This reduced footprint transceiver package requires the use of vertical transmitting and receiving devices which are passively aligned in a precise manner to optical fibers. The 110 crystalline silicon is anisotropically etched to reveal diamond-shaped holes with precise edges which received alignment pins at right angles to the surface emitting or receiving devices mounted on the alignment frame. The holes are etched by standard etching techniques in a wet-etch process of the wafer exposing 111 crystalline planes that serves as excellent vertical registration surfaces for locating the pins. The optical bench fabricated from the 110 crystalline silicon is readily adapted to other well known etching processes to effect vertical standoffs and side pedestals, well known to one of ordinary skill in the art. The present invention diverges from standard silicon optical bench technology in its use of the 110 crystalline silicon, rather than the standard 100 crystalline silicon which is used more widely in optical bench technology. In final form, the passive alignment member used in the mini-MT transceiver has the precisely, yet passively, aligned surface emitting and detecting optoelectronic devices mounted thereon with the standoffs and pedestals for accurate registration. The edges of the semi-diamond shaped holes on the perimeter of the passive alignment frame are used to register the location of the photonic die. The bow tie shaped passive alignment frame is sandwiched between a connector body supporting the registration pins, with the pins at a spacing set by industry standard. The precision vertical etched edges of the diamond shaped holes register positionally to the registration pins, thereby precisely locating the positions of the optical axes of the surface emitting or detecting die to the optical fiber in the mini-MT connector (as is disclosed in U.S. Pat. No. 5,913,002. The optical fiber of the transceiver is held in a direction normal to the devices on the bow tie surface by mini-MT ferrules. The lens element is interposed between the fiber and the mini-MT ferrule and the devices by a stack in order to properly effect the coupling of light from the fiber to the detector and, to the fiber from the emitter, again with a minimal degree of cross-talk.

DETAILED DESCRIPTION OF THE INVENTION

Figure 1:
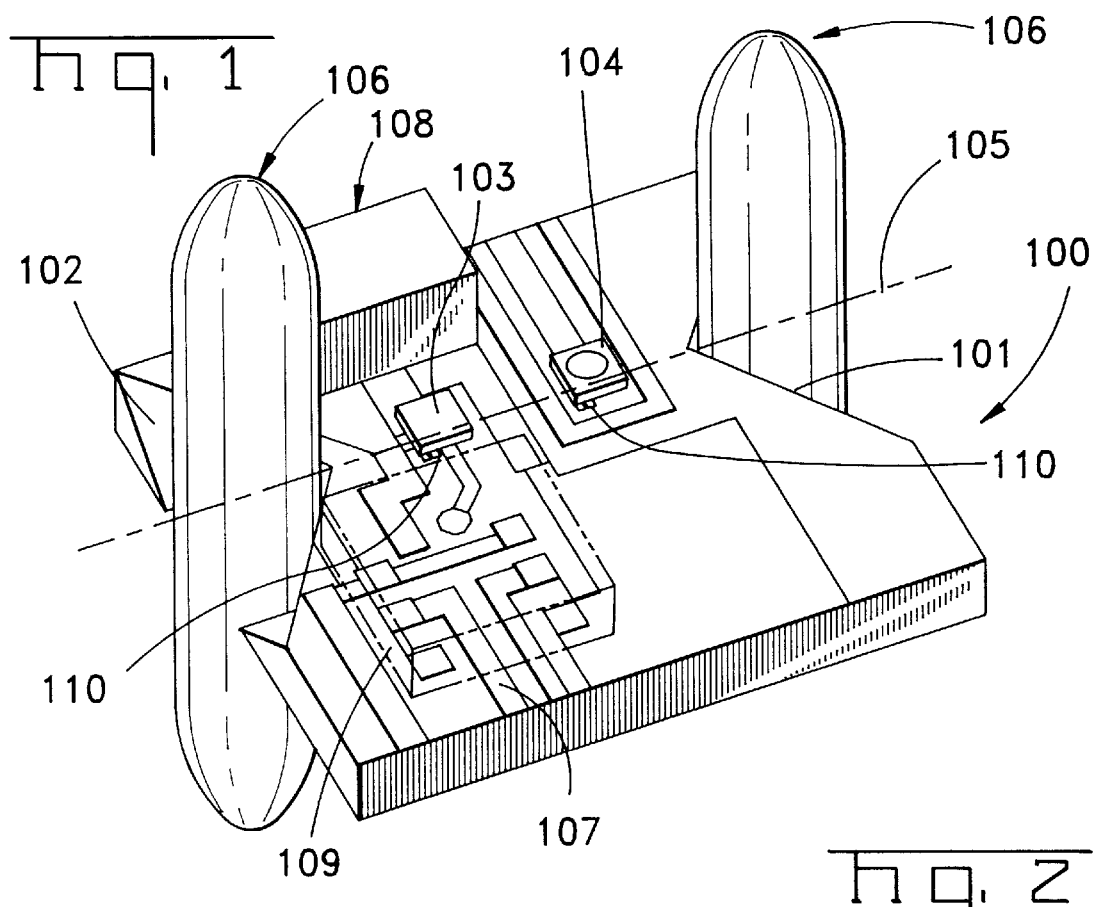
FIG. 1 is a perspective view of the bow-tie passive alignment frame of the present invention.

Turning to FIG. 1, the processed wafer bow-tie configuration is shown at 100 in FIG. 1. The wafer is preferably 110 crystalline silicon, rather than 100 crystalline silicon, which enables the holes etched in the wafer having vertical precise edges which serve as vertical v-grooves for positioning fibers or alignment pins at right angles to the surface emitting or surface detecting devices of the present invention. To this end, the semi-diamond shaped or half-diamond shaped openings are shown having sidewalls at 101 on either side of the wafer for positioning of the guidepins 106 in the mini-MT transceiver package, as is disclosed in U.S. Pat. No. 5,913,002 to Jiang. The holes in the wafer, which are half-diamond shaped as mentioned above, are effected by anisotropic crystallographic wet etching techniques which expose the 111 crystal planes (shown at 101) which serve as excellent vertical registration surfaces for locating the alignment pins 106. The properties of the etching of 110 crystalline silicon are well known to one of ordinary skill in the art, and further details can be found in the above referenced articles on "Optoelectronic Integration" and the article to Bassous, which are incorporated herein by reference above. In the present application, a diamond-shaped opening is revealed through anisotropic wet etching techniques well known in the art. In addition to the 111 planes which form guide surfaces 101, 201, the etching process also reveals 111 planes that angle down from the surface into the hole at an angle of approximately 32.26°. These are shown at 102 and 202, in FIGS. 1 and 2, respectively. As is most clearly shown in FIG. 1, the interference of these planes 102, 202 is avoided by sawing the diamond-shaped opening so that these surfaces hang to one side of the pins 106, 206 without making contact thereto. Further details of the etching process are described.

Figure 2:
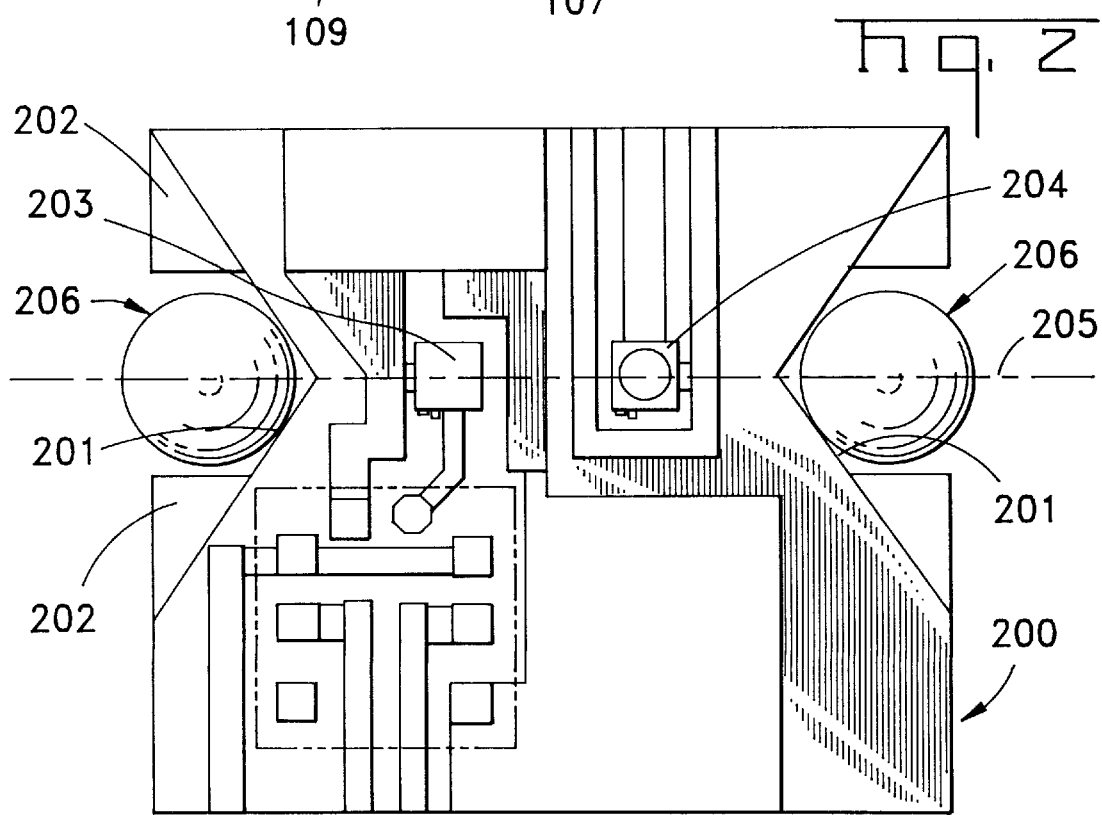
FIG. 2 is a top view of the passive alignment frame shown in FIG. 1.

The structure shown in FIGS. 1 and 2 has an optoelectronic transmitter shown generally at 104 and an optoelectronic detector shown generally at 103. The transmitter 104, 204 is preferably a vertical cavity surface emitting laser (VCSEL) or a surface emitting light emitting diode (SLED). The vertical cavity laser would be used in applications where higher speed data rate transmission is required, while the surface emitting LED would be reserved for lower speed transmission. Of course, the invention of the present disclosure is drawn to the alignment and registration of the surface emitting device, and the particular device chosen is not drawn to the substance of the invention of the present disclosure. Accordingly, one of ordinary skill in the art could choose the required transmitter for particular applications as he or she desires. The detector 103, 203 is a surface receiving detector, preferably a PIN photodiode, although other detectors are within the purview of the present invention as would be readily apparent to one of ordinary skill in the art. The metallization shown generally at 107 is to effect the electrical connections between the circuit element 108 and the PIN detector 103 as well as to effect the electrical connection between the PIN pre-amp 109 and the detector 103. This metallization is a stack of vacuum deposited layers of TI, gold alternatively TI, NI or CR, gold overcoated with an electroplated gold layer for a total thickness of 1 to 6 microns. In addition to the discussion above, this provides electrical interconnection between the photonic chips and external electronics and interconnection to preamplifiers and bypass capacitors that can be placed close to the photonic chips to achieve enhanced high speed transceiver performance.

The alignment pedestals and standoffs which are shown generally at 110, are used to effect the x, y planar alignment as well as the z height registration. To this end, the x, y planer alignment is effected through the pedestals, while the z height registration is effected generally through the standoffs. Of course, variations of the use of the pedestals and their registration relative to the transmitter and detector die are possible. To this end, one such variation is as disclosed in U.S. Pat. No. 5,981,975 to Imhoff, the disclosure of which is specifically incorporated herein by reference. Furthermore, variations to the type and method of manufacture of the standoffs and pedestals are possible. Further details of the variations to the types and method of manufacture of the pedestals are found in U.S. patent application Ser. No. 08/674,770 now U.S. Pat. No. 5,905,831, to Boudreau, et al., which is specifically incorporated herein by reference.

Figure 3A:
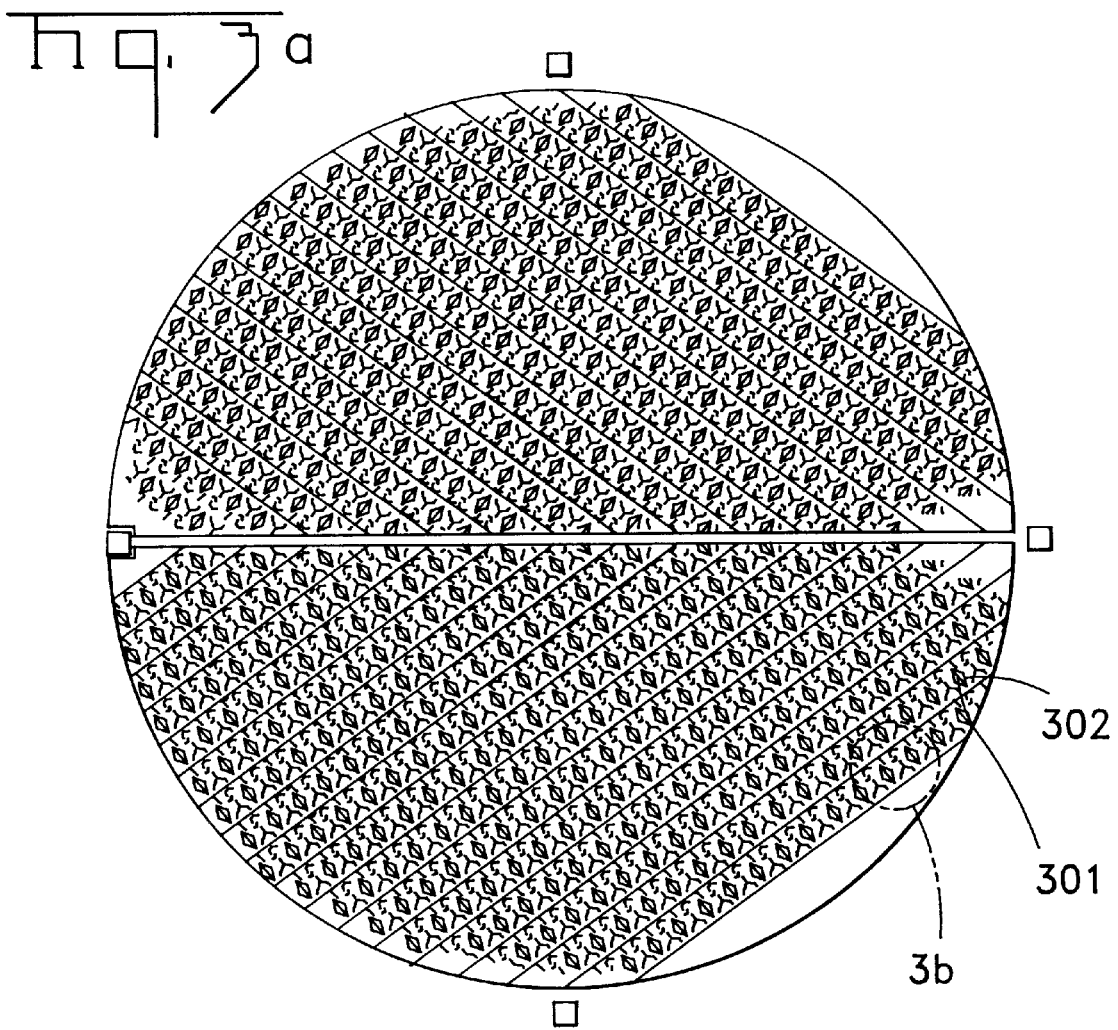
FIG. 3a is a top view of the processed wafer prior to the dicing of the individual passive alignment frames of the present invention.

Turning to FIGS. 2 and 3a, the openings for registration of the pins 206 as well as alignment of the pins to the devices 203, 204 is discussed. FIG. 2 shows in top view the alignment pins 206 as large round structures. The silicon waferboard is denoted a "bow-tie" because when the diamond shaped openings are cut or diced, the shape of the silicon waferboard alignment frame 200 resembles the shape of a bow-tie. The alignment pins 206 effect a tangential contact on the inside edge of the diamond holes, shown at 202. These inside edges are crystallographically etched to very high precision, typically ±1 micrometer or better, and because they are vertical, are ideally suited for registering the bow-tie alignment frame 200 relative to the pins 206. Because the sidewalls 202 of the diamond-shaped holes can be etched in both location and orientation to very high precision, the placement of the die 203, 204 relative to these is effected with great precision, the placement of the pins 206 is also effected with great precision and relative to the die 203, 204. That is, because the devices 203, 204 are registered mechanically to the bow-tie using the alignment pedestal and standoffs and the etched holes having very precise sidewalls 202 are precisely located relative to the etched pedestals and standoffs, it naturally follows that the pins are registered relative to the devices with great precision, typically ± two microns or better. This is most readily understood through a study of FIGS. 1 and 2. In the preferred embodiment with the semi-diamond shaped holes, the silicon substrate is photolithographically processed to have the pedestals and standoffs 110 placed relative to the semi-diamond shaped holes on either side of the substrate so that the PIN detector 103,203 and LED 104,204 are located along an imaginary line 105,205 that traverses the center of the PIN detector 103,203 and LED 104,204 and bisects the semi-diamond shaped holes.

Figure 3B:
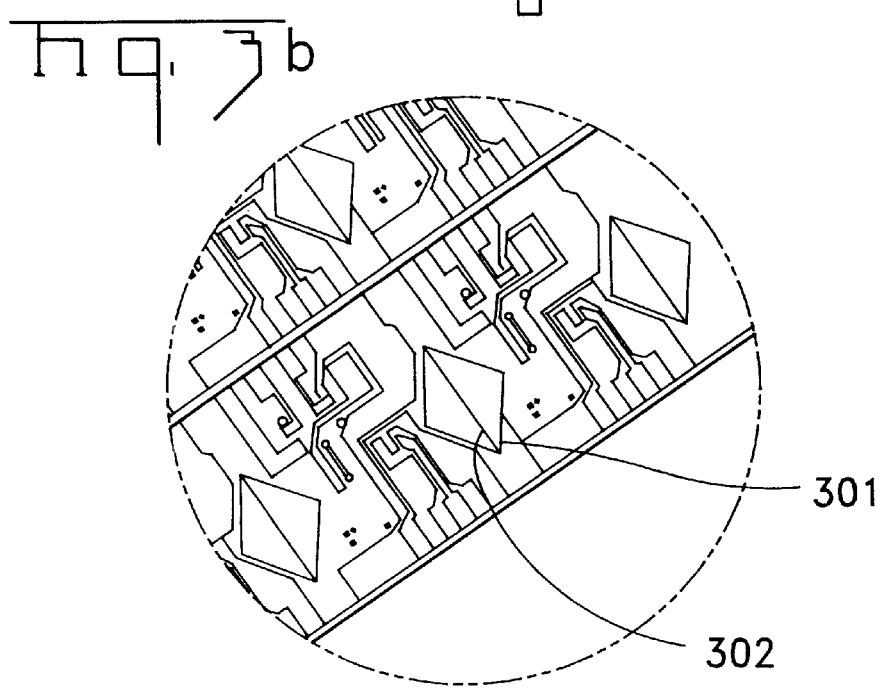
FIG. 3b is an enlarged view of a section of the wafer showing two diamond shaped openings prior to dicing.

FIGS. 3*a*–3*b* shows the top view of an exemplary product wafer which is used to fabricate the bow-tie silicon waferboard alignment frame 100, 200. In particular, the diamond-shaped openings are shared with neighboring product die, with the final product bow-tie being effected by a dicing or sawing along the center of the diamond. To this end, as shown in exploded view in FIG. 3A, the diamonds shown generally at 301 are cut along the line 302 in order to remove the desired product, the bow-tie alignment frame from the wafer. The openings which remain in the side of the alignment frame are for receiving the pin structures as shown in FIGS. 1 and 2. Standard photolithographic etching techniques are employed in the processing of the wafer. To this end, the mask shown shows diamonds tilted both to the right and to the left in two separate fields of the wafer. The etching is sensitive to the orientation of the surface of the wafer. For a typical wafer, the left field may etch correctly, but if the wafer were flipped over and patterned on its reverse side then the right field may etch correctly. In order to fully utilize the wafer, the crystal as grown must have a known face direction and a corresponding mask with the correct selection of field direction. The exemplary wafer shown in FIG. 4 in top view has both fields present, to ensure that at least 50% yield of good die for the 110 wafer of unknown face crystal orientation. The etching found for these parts follows the orientation of the 111 crystal planes that serve to stop the etch once exposed because of its slow etch rate. After the diamond shaped holes are etched, the individual bow-tie shaped silicon waferboard platforms are diced from the wafer. Dicing is performed using a conventional dicing saw typically used in semiconductor manufacturing, and the dicing streets are through the corners of the diamonds not used to register the pins, exposing vertical wall corners used for registering the pins. The bow-tie silicon waferboard passive alignment frames can be made in batch silicon fabrication processes to effect large scale production with high photolithographic precision suitable for fiber optic communications.

The invention having been described in detail, it is clear that modifications and variations are possible. The invention is generally drawn to the use, preferably, of 110 crystalline silicon which is etched to effect a alignment frame having semi-diamond shaped registration holes for the registration of pins in a mini-MT or reduced footprint optical transceiver. The frame has disposed thereon the transceiver components, and is readily fabricated in batch-mode semiconductor processing. Clearly, there are other shaped holes for the pin registration, and other materials can be used to effect the frame. To the extent that these modification are readily apparent to one of ordinary skill in the art having had the benefit of the present disclosure, such are within the scope of the present invention.

What is claimed is:

1. A passive alignment member for surface emitting and detecting optoelectronic devices, comprising:

a silicon substrate having a front surface and a back surface and a selected thickness therebetween;

side surfaces having holes with vertical registration surfaces etched therein for receiving alignment pins;

and at least one optoelectronic device disposed on said front surface, said device being aligned to said hole.

2. A passive alignment member as recited in claim 1 wherein said substrate is 110 crystalline silicon.

3. A passive alignment member as recited in claim 2 wherein said holes are semi-diamond shaped.

4. A passive alignment member as recited in claim 3 wherein said vertical registration surfaces of said semi-diamond shaped holes are in 111 crystalline planes.

5. A passive alignment member for surface emitting and detecting optoelectronic devices comprising:

a 110 crystalline silicon substrate having a front surface and a back surface and a selected thickness therebetween;

side surfaces substantially orthogonal to said front surface and said back surface, said side surfaces having semi-diamond shaped holes selectively etched therein for receiving alignment pins, said semi-diamond shaped holes having vertical registration surfaces in 111 crystalline planes;

and at least one optoelectronic device disposed on said front surface of said substrate, said semi-diamond shaped holes being positionally registered to said pins, thereby precisely locating an optical axis of said optoelectronic device to an optical fiber.

6. A passive alignment member as recited in claim 5 further comprising alignment pedestals and standoffs for positioning said at least one optoelectronic device.

* * * * *